United States Patent [19]
Heinrich et al.

[11] Patent Number: 5,539,516
[45] Date of Patent: Jul. 23, 1996

[54] SCANNING PULSED PROFILOMETER

[75] Inventors: Harley K. Heinrich, Brewster; Joelle Prince, Liverpool, both of N.Y.

[73] Assignee: International Business Machines Corporation, Armonk, N.Y.

[21] Appl. No.: 236,722

[22] Filed: Apr. 29, 1994

[51] Int. Cl.⁶ .................................................. G01B 9/02
[52] U.S. Cl. .......................................... 356/345; 356/360
[58] Field of Search ................................... 356/345, 349, 356/358, 359, 360

[56] References Cited

U.S. PATENT DOCUMENTS

| | | |
|---|---|---|
| 4,358,201 | 11/1982 | Makosch . |
| 4,422,764 | 12/1983 | Eastman . |
| 4,576,479 | 3/1986 | Downs . |
| 4,818,110 | 4/1989 | Davidson . |
| 5,042,949 | 8/1991 | Greenberg et al. . |
| 5,299,170 | 3/1994 | Shidata et al. ............... 356/345 |

OTHER PUBLICATIONS

H. K. Wickramasinghe, "Differential Laser Heterodyne Micrometrology", Optical Engineering 24(6), 926–929, Nov./Dec. 1985.

C. C. Williams et al., "Optical Ranging By Wavelength Multiplexed Interferometry", J. Appl. Phys. 60(6), Sep. 1986, pp. 1900–1903.

T. C. Strand, "Optical Three–Dimensional Sensing For Machine Vision", Optical Engineering 24(1), 033–040, Jan./Feb. 1985.

*Primary Examiner*—Samuel A. Turner
*Attorney, Agent, or Firm*—Daniel P. Morris

[57] ABSTRACT

An optical profilometer measures the surface profile of a sample by using a scanning autocorrelator and relating the autocorrelation signals at the scanning frequency, $f$, and twice the scanning frequency, $2f$, to the path length changes in one of the arms. The amplitude of the signal at the scanning frequency is used to control the average position of the scanned arm of the autocorrelator, thereby further extending the linear range of the profilometer. The scanning rate of the autocorrelator is set to be much faster than the mechanical noise so that mechanical fluctuations of the sample produce slowly varying fluctuations in the sample scans.

16 Claims, 2 Drawing Sheets

SCANNING PULSED PROFILOMETER

FIELD OF INVENTION

The present invention relates to an apparatus and method for measuring surface profiles of samples. More particularly, the apparatus and method relate the frequency content of a short electromagnetic pulse autocorrelation to the displacement of one of the paths of an autocorrelator interferometer.

BACKGROUND OF THE INVENTION

Optical interferometers of various forms (reference 1) have been used to measure the surface profiles of samples. Unmodulated interferometric systems require fringe counting and have a nonlinear distance-signal relationship. Modulated interferometric approaches such as laser heterodyne (reference 2) and wavelength multiplexed interferometry (reference 3) improve the linearity and range of the profilometer, but are complex to implement. The present invention presents a pulsed profilometer which is insensitive to sample mechanical vibrations, has a linear range of several orders of magnitude, and is simpler to implement than prior approaches.

The present invention describes a new surface profilometry system. The system relates the frequency content of the signal from a scanning autocorrelator to the surface variations of a sample placed in one of the arms of the autocorrelator. This profilometry system solves the following problems of the previous approaches:

1. Conventional interferometers have a linear range limited by the wavelength of light. The system of the present invention has a much larger linear range, typically from angstroms to microns, which is determined by the laser pulsewidth.
2. Wide dynamic range interferometers, like those suggested by Williams and Wickramasinghe, require multiple laser sources or multiple wavelength lasers. The system according to the present invention uses only a single pulsed laser source.
3. Conventional profilometers are sensitive to the sample vibrations. The system according to the present invention is insensitive to sample vibrations that are slow compared to the scanning rate of the autocorrelator.

REFERENCES

1 T. C. Strand "Optical three-dimensional sensing for machine vision", Opt. Engr. v. 24, pp. 33–40, 1985
2 H. K. Wickramasinghe, "Differential laser heterodyne micrometrology", Opt. Engr. v. 24, pp. 926–929, 1985
3 C. C. Williams, H. K. Wickramasinghe, "Optical ranging by wavelength multiplexed interferometry", J. Appl. Phys. v. 60, pp. 1900–1903, 1986

SUMMARY OF THE INVENTION

A broad aspect of the present invention is an apparatus using electromagnetic beams for measuring height variations on a surface of a workpiece. The apparatus has a means for splitting an input beam into a first beam and a second beam; a means for directing the first beam at the surface to generate a first reflected beam; a means for scanning the first beam oil the surface; a means for directing the second beam along a path having a length; a means for adjusting the length at an adjustment frequency; a means for combining the first reflected beam and the second beam to form a combined beam which has an overlap of the first reflected beam and the second beam, the overlap varying in response to the adjustment frequency; a means for setting the length at a value such that the first reflected beam and the second beam are coincident; a means for monitoring the intensity of the overlap, the intensity having a first component having a first intensity having a frequency equal to two times said adjustment frequency when the first reflected beam is coincident with the second beam and having a second component having a second intensity having a frequency equal to the adjustment frequency when the first reflected beam is not coincident with the second beam; and a means for comparing the first intensity and the second intensity as the means for scanning scans the first beam on the surface to measure said height variations.

Another broad aspect of the present invention is a method using electromagnetic beams for measuring height variations on a surface of a workpiece. The method splits an input beam into a first beam and a second beam; directs the first beam at the surface to generate a first reflected beam; scans the first beam on the surface; directs the second beam along an optical path having a length; adjusts the length at an adjustment frequency; combines the first reflected beam and the second beam to form a combined beam which has an overlap of the first reflected beam and the second beam, the overlap varying in response to the adjustment frequency; setting the length at a value such that the first reflected beam and the second beam are coincident; monitoring the intensity of the overlap, the intensity having a first component having a first intensity having a frequency equal to two times said adjustment frequency when the first reflected beam is coincident with the second beam and having a second component having a second intensity having a frequency equal to the adjustment frequency when the first reflected beam is not coincident with the second beam; and means for comparing the first intensity and the second intensity as the means for scanning scans the first beam on the surface to measure the height variations.

BRIEF DESCRIPTION OF THE DRAWINGS

These and other objects, features and advantages of the present invention will become apparent upon a consideration of the following detailed description of the invention when read in conjunction with the drawing figures, in which.

DETAILED DESCRIPTION

Figure 1:
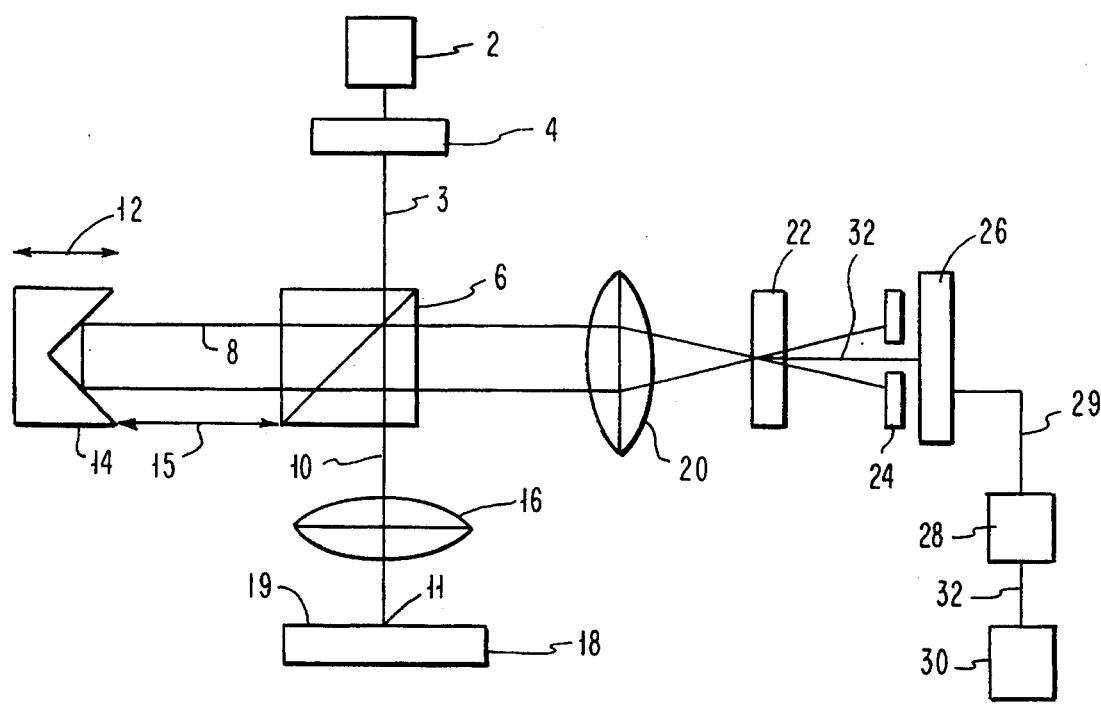
FIG. 1 is a schematic diagram of the scanning pulsed profilometer according to the present invention.

FIG. 1 shows a schematic diagram of the scanning pulsed profilometer according the present invention. Light from a laser source 2, preferably a pulsed laser source such as a YAG laser, is isolated from the system by an optical isolator 4, such as a light diode to prevent a pulse from returning into the laser. The input beam 3 is then split into two paths 8 and 10 of a conventional scanning interferometer, where one of the arms, path 8, is mechanically scanned with scanning stage represented by arrows 12 at a rate of f cycles/second. A typical stage is Input beam 3 is split along the two paths 8 and 10 by conventional beam splitter 6. A lens 16 focuses the light in the other arm of the interferometer, path 10, onto a spot 11 on a sample 18. Light from both the sample 18 in path 10 and the scanning path 8 are returned to the beam-splitter 6 and diverted to the autocorrelator composed of the focusing lens 20, a second harmonic crystal 22, a beam stop 24, and a detector 26. Detector 26 can be a conventional photodetector. The second harmonic crystal 22 of the autocorrelator produces a signal at the detector 26 that is proportional to the amount of temporal overlap of the laser pulses from the two paths 8 and 10 of the interferometer. When the two paths of the interferometer 8 and 10 are matched, the signal from the detector 26 as a function of the position of the retroreflector 14 in path 8 will be the autocorrelation of the pulses from the laser source 2, and will be given by $$S(\tau) = \int_{-\infty}^{\infty} I(t)I(t+\tau)dt,$$

where τ is the delay time experienced by the laser pulse in path 8 of the interferometer relative to path 10, S(τ) is the autocorrelation signal from the detector 26, and I(t) and I(t+τ) are the signals from the two arms (path 10 and path 8 respectively) of the interferometer. Therefore, for each cycle of the scanning stage 12, the signal from the detector 26 will map out the autocorrelation of the laser pulse twice, and when the two paths of the interferometer 8 and 10 are exactly matched, the signal from the detector 26 during the forward scan of the scanning stage 12 will exactly match that on the reverse scan; thus detector 26 will measure a signal having a frequency of 2f, that is twice the frequency of scanning stage 12. However, when the two path lengths of the interferometer are mismatched, the detector signal 26 during the forward scan of the scanning stage 12 will be the mirror image of the signal on the reverse scan. Thus, a signal measured by detector 26 having one peek for each scan of stage 12. Thus, if signal can be detected with a conventional filter 28 which is electrically connected by line 29 to detector 26. Filter 28 is electrically connected by line 32 to convention ac power meter 30 which measures the 1f signal detected by detector 26. This reversal of the signal during the forward and backward scan of the scanning stage 12 produces a signal that varies at the same rate (1f) as that of the scanning stage (12) rather than at twice the frequency (2f) as in a conventional scanning autocorrelator.

Figure 2:
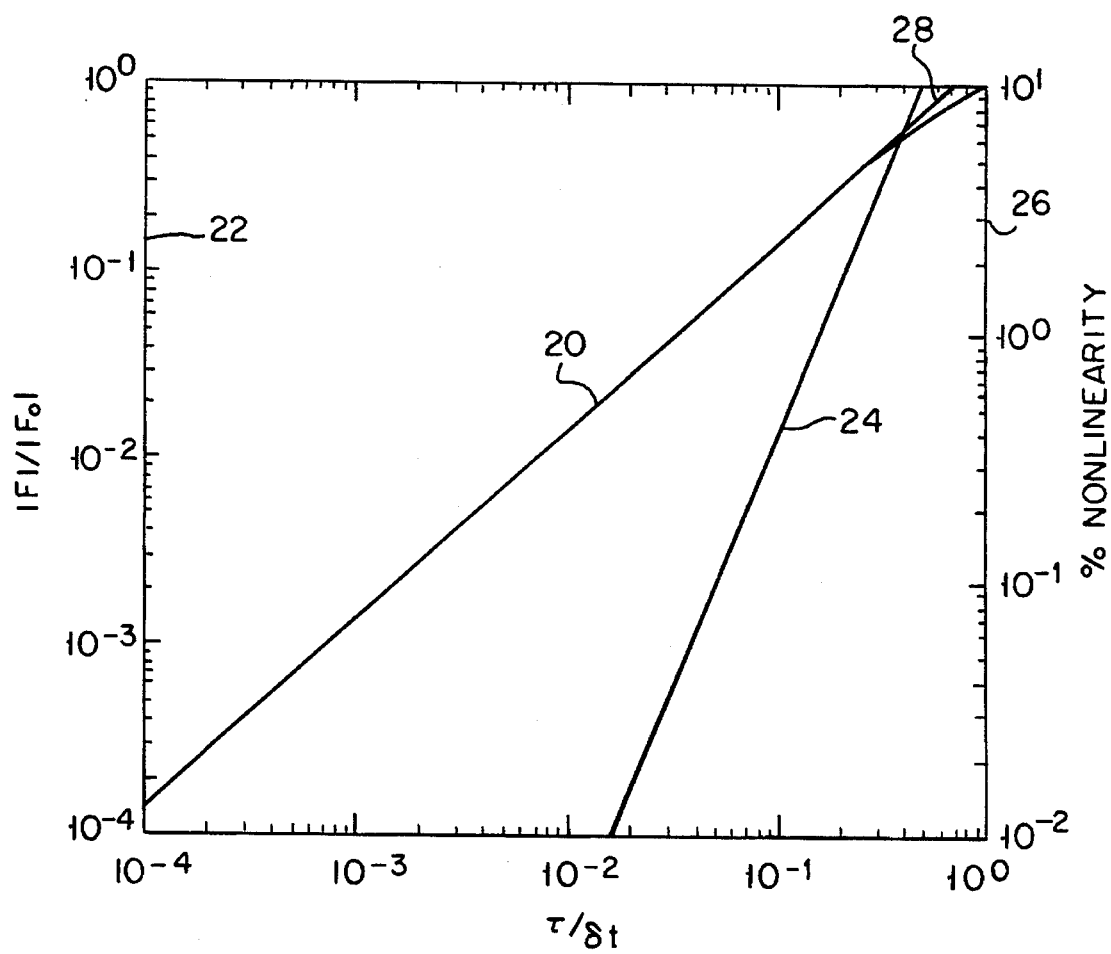
FIG. 2 is a plot of the growth of the ratio of the 1f signal to the 2f signal as a function of the mismatch between the two arms of the interferometer.

Curve 20 of FIG. 2 shows the growth of the 1f signal from the detector 26 as a function of the mismatch between the two arms of the interferometer 8 and 10. Axis 22 is the vertical scale for curve 20. F is the 1f signal intensity and Fo is the 2f signal intensity. The analysis shows that the signal is linear over many orders of magnitude of mismatch between the two arms of the interferometer. Curve 24 is a plot of the percent of the nonliniarty of curve 20. The vertical axis for curve 24 is axis 26. Curve 28 of FIG. 2 is the straight line fit to curve 20. Since the analysis is done in terms of normalized mismatch between the two arms of the interferometer, where the laser pulse width δt is used as the normalizing parameter, the range of interest can easily be modified by varying the laser pulse width. Thus t/δt is the number of pulse widths difference between the two paths 8 and 10 of the interferometer. In addition, if we use the magnitude of the 1f signal to control the average position of the scanning stage 12 in a feedback loop, we can further extend the linear range of this profilometer. Curve 20 of FIG. 2 is computationally calculated and is generally applicable to any pulse width for the present invention. It is within the skill of the art to generate curve 20 from the teaching herein.

This profilometer can also be made insensitive to the mechanical vibrations of the sample 18. If the mechanical vibrations of the sample are slow compared to the motion of the scanning stage, the noise from these vibrations can be averaged out. Alternatively, if the sample 18 is moved to form a surface profile, random mechanical motion of the sample will produce a baseline shift of the profile taken from the sample. These slow variations may be filtered out with conventional high-pass filtering techniques.

Sample 18 can be more in a plane perpendicular to the direction of beam 10 by a conventional XY stage to form a profile of the surface 19 of sample 18. A profile is generated by focusing beam 10 on a spot 11 on surface 19 of sample 18; adjusting the distance 15 of the reflector 14 from beam splitter 6 so that the 2f signal is measured by detector 26 which corresponds to path 8 and 10 beams equal. As sample 18 is scanned in a plane perpendicular to beam 10, if there is a height variation of surface 19 both paths 8 and 10 will no longer be equal and if a signal will be measured by detector 26 and meter 30. From the plot of FIG. 2 and the pulse width the height variation from the starting point of the scan can be determined.

While the present invention has been shown and described with respect to specific embodiments, it will be understood that it is not thus limited. Numerous modifications, changes, and improvements will occur which fall within the scope and spirit of the invention.

We claim:

1. An apparatus using electromagnetic beams for measuring height variations on a surface of a workpiece comprising:

means for splitting an input beam into a first beam and a second beam;

means for directing said first beam along a first path having a first length at said surface to generate a first reflected beam;

means for scanning said first beam on said surface;

means for directing said second beam along a second path having a second length;

means for adjusting said length at an adjustment frequency;

means for combining said first reflected beam and said second beam to form a combined beam which has an overlap of said first reflected beam and said second beam, said overlap varying in response to said adjustment frequency;

means for setting said length at a value such that said first reflected beam and said second beam are coincident;

means for monitoring an intensity of said overlap, said intensity having a first component having a first intensity a frequency equal to two times said adjustment frequency when said first length is matched with said second beam and having a second component having a second intensity having a frequency equal to said adjustment frequency when said first length is not matched with said second length; and means for comparing said first intensity and said second intensity as said means for scanning scans said first beam on said surface to measure said height variations.

2. An apparatus according to claim 1, wherein said means for splitting said input beam is a beam splitting cube.

3. An apparatus according to claim 1, wherein said means for directing said first beam is a lens.

4. An apparatus according to claim 1, wherein said means for scanning is an xy table.

5. An apparatus according to claim 2, wherein said means for directing said second beam is said beam splitting cube and in combination with at least two reflecting surfaces.

6. An apparatus according to claim 5, wherein said means for adjusting said length is a scanning stage supporting at least one of said at least two reflecting surfaces.

7. An apparatus according to claim 1, wherein said means for combining is a second harmonic crystal.

8. An apparatus according to claim 1, wherein said means for monitoring is a detector.

9. An apparatus according to claim 8, wherein said means for monitoring further includes a filter permitting said intensity to pass to a power meter.

10. An apparatus according to claim 1, wherein said apparatus is an optical apparatus.

11. An apparatus according to claim 1, wherein said input beam is a pulse, said first beam is a first pulse, said second beam is a second pulse and said first reflected beam is a first reflected pulse.

12. An apparatus according to claim 1, further including a computer to control said apparatus.

13. An apparatus according to claim 11, wherein said means for combining said first reflected beam and said second beam is a second harmonic crystal which in said overlap generates a second harmonic of said input beam which is monitored by said means for monitoring.

14. An optical apparatus for measuring height variations on a surface of a workpiece comprising:
   a pulsed laser source generating an input pulse, which is directed at a beam splitter,
   said beam splitter splitting said input pulse into a first pulse and a second pulse;
   a first lens for directing said first pulse in a first direction onto said surface;
   means for scanning said surface in a plane perpendicular to the direction of said first direction;
   said beam splitter directs said second pulse in a second direction to a retroreflector which is mounted on a scanning stage;
   means for accelerating said scanning stage at a frequency;
   said retroreflector directs said second pulse in a path parallel and opposite to said second direction through said beam splitter as a reflected second pulse;
   said first beam is reflected from said surface back to said beam splitter as a first reflected pulse;
   a second harmonic crystal;
   a second lens for focusing said first reflected pulse and said second reflected pulse on said second harmonic crystal which generates a second harmonic signal in response to a varying overlap of said first reflected pulse and said second reflected pulse in response to said frequency of said scanning stage;
   a detector for receiving said second harmonic signal;
   said second harmonic signal having a first component at a first frequency equal to said frequency and a second component at second frequency equal to two times said frequency;
   said detector having an electrical output;
   means for comparing said first frequency and said second frequency as said means for scanning scans said first pulse on said surface to measure said height variations;
   said electrical output is connected to a filter; and
   said filter is electrically connected to a power meter.

15. A method using electromagnetic beams for measuring height variations on a surface of a workpiece comprising:
   splitting an input beam into a first beam and a second beam;
   directing said first beam at said surface to generate a first reflected beam;
   scanning said first beam on said surface;
   directing said second beam along a path having a length;
   adjusting said length at an adjustment frequency;
   combining said first reflected beam and said second reflected beam to form a combined beam which has an overlap of said first reflected beam and said second beam, said overlap varying in response to said adjustment frequency;
   setting said length at a value such that said first reflected beam and said second beam are coincident;
   monitoring an intensity of said overlap, said intensity having a first component having a first intensity having a frequency when said first reflected beam is coincident with said second beam and having a second component having a second intensity having a frequency equal to said adjustment frequency when said first reflected beam is not coincident with said second beam; and
   comparing said first intensity and said second intensity as said means for scanning scans said first beam on said surface to measure said height variations.

16. An apparatus according to claim 1, further including using a computer to control said method.

* * * * *